(12) United States Patent
Lowrey et al.

(10) Patent No.: US 6,431,808 B1
(45) Date of Patent: Aug. 13, 2002

(54) STORAGE RACK HAVING ROLLER TRACK

(75) Inventors: Michael P. Lowrey, Tampa, FL (US); Linda P. Lascara, Goodlettsville, TN (US)

(73) Assignee: Unarco Material Handling, Inc., Springfield, TN (US)

( * ) Notice: Subject to any disclaimer, the term of this patent is extended or adjusted under 35 U.S.C. 154(b) by 0 days.

(21) Appl. No.: 09/727,119

(22) Filed: Nov. 30, 2000

(51) Int. Cl.[7] .................. B65G 13/00; A47B 57/04; A47B 96/06
(52) U.S. Cl. .................. 414/276; 211/151; 193/35 R
(58) Field of Search .................. 414/276; 211/151, 211/59.2; 193/35 R

(56) References Cited

U.S. PATENT DOCUMENTS

| | | | |
|---|---|---|---|
| 2,138,418 A | * 11/1938 | Fahrne | 211/59.2 |
| 4,168,780 A | * 9/1979 | Parrot | 211/151 |
| 5,181,623 A | * 1/1993 | Linden et al. | 211/183 |
| 5,474,412 A | 12/1995 | Pfeiffer et al. | |
| 5,951,228 A | 9/1999 | Pfeiffer et al. | |
| 6,073,743 A | * 6/2000 | Mefford | 193/35 R |
| 6,102,185 A | 8/2000 | Neuwirth et al. | |
| 6,132,158 A | 10/2000 | Pfeiffer et al. | |

FOREIGN PATENT DOCUMENTS

| | | |
|---|---|---|
| EP | 0 273 345 A2 | 7/1988 |
| EP | 0 576 693 A1 | 5/1994 |

* cited by examiner

Primary Examiner—Steven A. Bratlie
(74) Attorney, Agent, or Firm—Wood, Phillips, Katz, Clark & Mortimer

(57) ABSTRACT

In a storage rack comprising a front beam and a back beam, a roller track comprises two side rails and a series of rollers defining a tangent plane. A front hook, which is hooked over the front beam, defines a ledge projecting backwardly. A back hook, which is hooked over the back beam, defines a ledge projecting frontwardly. At each end, each side rail is supported on the ledge of the hook at that end. Each hook has a flange projecting upwardly from its ledge, between the side rails, so as to limit lateral movement of the roller track. Comparatively, the front hook is taller and the back hook is shorter, whereby the roller track can be easily inclined.

4 Claims, 3 Drawing Sheets

STORAGE RACK HAVING ROLLER TRACK

FIELD OF THE INVENTION

This invention pertains to a storage rack of a type comprising a front beam, a back beam, and a roller track, wherein the roller track comprises two side rails and a series of rollers, each of which extends and is journalled between the side rails and each of which projects above the side rails. In the storage rack, the roller track may be one of plural roller tracks on a given tier, which may be one of plural tiers. If the roller track is inclined frontwardly and downwardly, the storage rack may be also called a "flow" rack.

BACKGROUND OF THE INVENTION

A storage rack of the type noted above is disclosed in U.S. Pat. No. 6,132,158, in which a roller track is called a conveying member. As disclosed therein, a hanger having a portion hooked over a front beam has another portion supporting a front end of a roller track, via a member extending between and bracing the side rails near a front end of the roller track, and a hanger having a portion hooked over a back beam has another portion supporting a back end of the roller track, via a member extending between and bracing the side rails near a back end of the roller track.

As also disclosed in U.S. Pat. No. 6,132,158, the bracing member supported near the front end of the roller track is higher in relation to the side rails and the bracing member supported near the back end of the roller track is lower in relation to the side rails. Thus, the roller track can be frontwardly and downwardly inclined, even if the front and back beams are level with each other. U.S. Pat. No. 6,132,158 also discloses that the hangers, which are similar to each other, can be adjustably positioned along the respective beams.

A storage rack of related interest is disclosed in European Patent Publication No. 576,693, in which similar hangers that appear to be similarly adjustable are used to support plural rails without rollers, via flanges bent from the rails and fastened to the hangers via welding, bolting, or riveting, or via tabs projecting through slots in the hangers and bent under the hangers. A storage rack of related interest is disclosed in U.S. Pat. No. 4,955,490, in which similar hangers that appear to be similarly adjustable are used to support plural rails without rollers, via notched flanges formed on the hangers and preventing lateral movement of the rails.

A storage rack of related interest is disclosed in U.S. Pat. No. 6,102,185. Roller tracks of related interest are disclosed in U.S. Pat. No. 4,239,100, Re. 34,924, U.S. Pat. Nos. 5,435,427, and 5,476,167.

SUMMARY OF THE INVENTION

This invention provides a storage rack of the type noted above, which comprises a front beam, a back beam, and a roller track. The roller track may be one of plural roller tracks on a given tier, which may be one of plural tiers. The roller track comprises two side rails and a series of rollers, each of which extends and is journalled between the side rails and each of which projects above the side rails. The rollers define a tangent plane above the side rails.

The storage rack further comprises a front hook having an upper portion, which is hooked over an upper edge of the front beam, and a lower portion, which defines a ledge projecting backwardly toward the back beam. The storage rack further comprises a back hook having an upper portion, which is hooked over an upper edge of the back beam, and a lower portion, which defines a ledge projecting frontwardly toward the front beam.

Each side rail has a front end, at or near which said side rail is supported on one of two end portions of the ledge defined by the lower portion of the front hook. Each side rail has a back end, at or near which said side rail is supported on one of two end portions of the ledge defined by the lower portion of the back hook. This invention does not require that the front and back ends of the side rails differ as to where or how the side rails are braced.

According to a first aspect of this invention, the ledge defined by the lower portion of the front hook is disposed below the upper portion of the front hook, where hooked over the front beam, by a comparatively greater distance and the ledge defined by the lower portion of the back hook is disposed below the upper portion of the back hook, where hooked over the back beam, by a comparatively lesser distance. Thus, the roller track can be frontwardly and downwardly inclined, even if the front and back beams are level with each other.

Preferably, when the first aspect of this invention is embodied, the tangent plane defined by the rollers above the side rails intersects the front hook, below where the front hook hooks over the front beam. Thus, the front hook provides a stop for a carton rolling along the roller track, toward the front beam.

According to a second aspect of this invention, each hook has a flange projecting upwardly from the ledge defined by the lower portion of said hook, between the end portions of the ledge defined by the lower portion of said hook and between the side rails, so as to limit lateral movement of the roller track on the ledge defined by the lower portion of said hook. The first and second aspects of this invention can be advantageously combined so that each hook is approximately as wide as the roller track at the lower portions of the side rails.

In a comparative sense, the front hook is taller, or deeper, and the back hook is shorter, or shallower. Similar taller and shorter hooks can be similarly used for fitting onto a storage rack, which has a front beam and a back beam, an elongate structure other than a roller track, such as an elongate structure having two side rails.

DETAILED DESCRIPTION OF THE PREFERRED EMBODIMENTS

Figure 1:
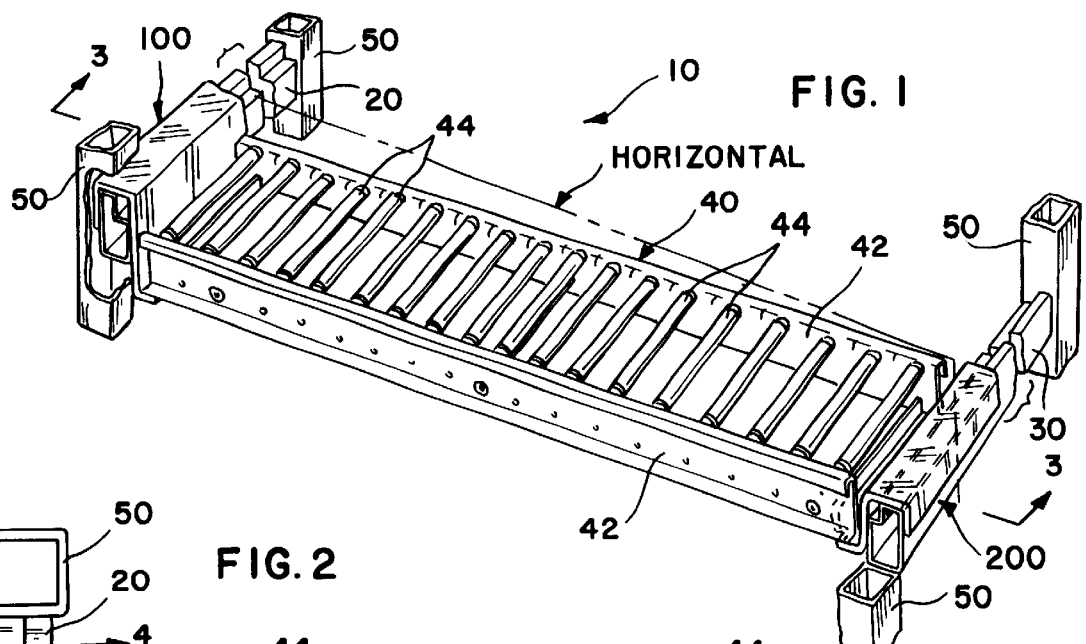
FIG. 1 is a perspective view of a storage rack constituting a preferred embodiment of this invention and comprising a front beam, a back beam, and a roller track, along with a front hook and a back hook.
Figure 2:
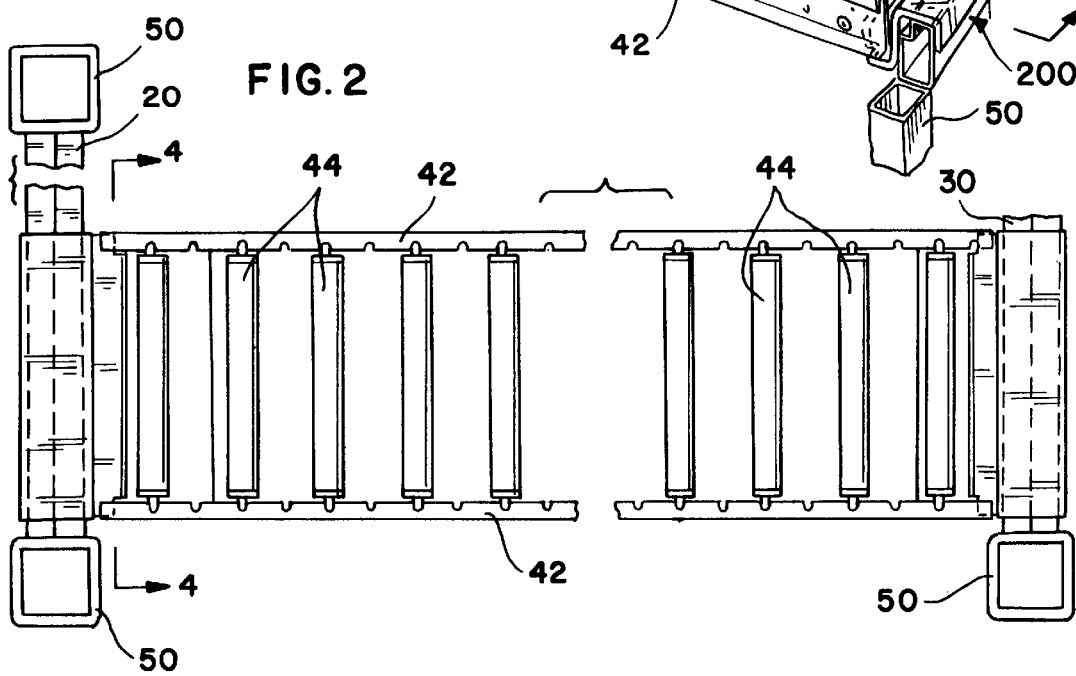
FIG. 2, on an enlarged scale, is a top plan of the storage rack, as shown in FIG. 1, except that a middle portion of the roller track is broken away.
Figure 3:
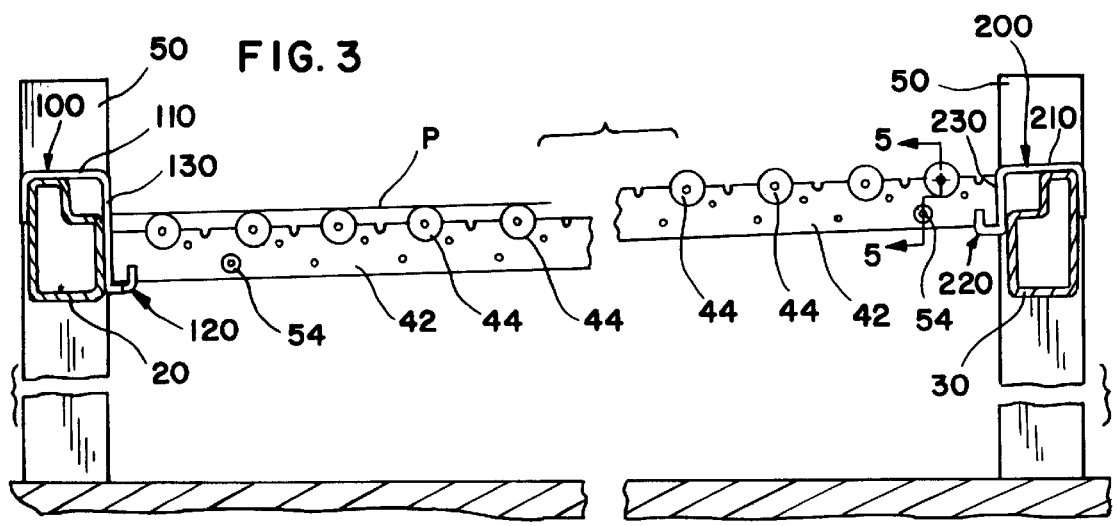
FIG. 3, on a similar scale, is a sectional view taken along line 3—3 of FIG. 1, in a direction indicated by arrows, except that a middle portion of the roller track is broken away.
Figure 4:
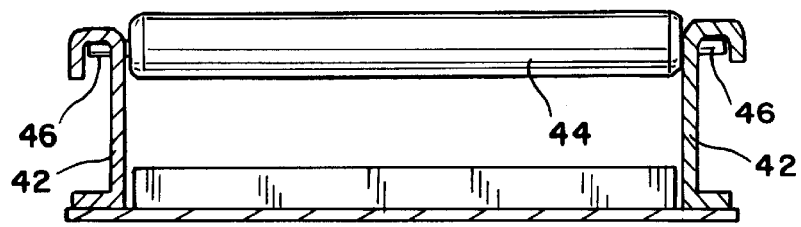
FIG. 4, on a further enlarged scale, is a sectional view taken along line 4—4 of FIG. 2, in a direction indicated by arrows.
Figure 5:
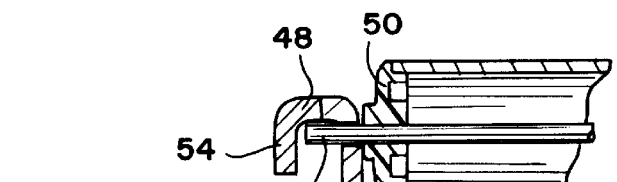
FIG. 5, on an enlarged scale, is a fragmentary, sectional view taken along line 5—5 of FIG. 2, in a direction indicated by arrows.
Figure 6:
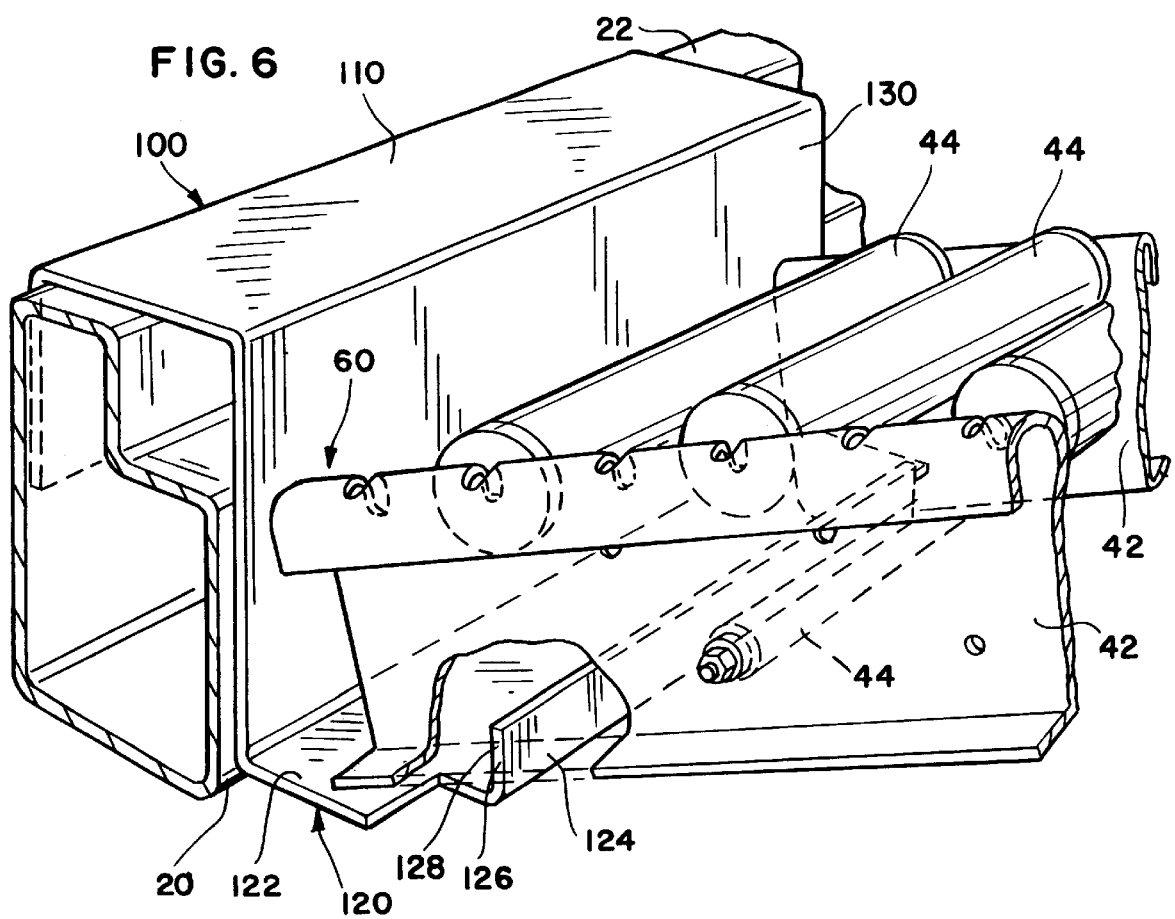
FIG. 6 is a greatly enlarged, fragmentary, perspective view of the front end of the roller track, as supported by the front hook, which is hooked over the front beam.
Figure 7:
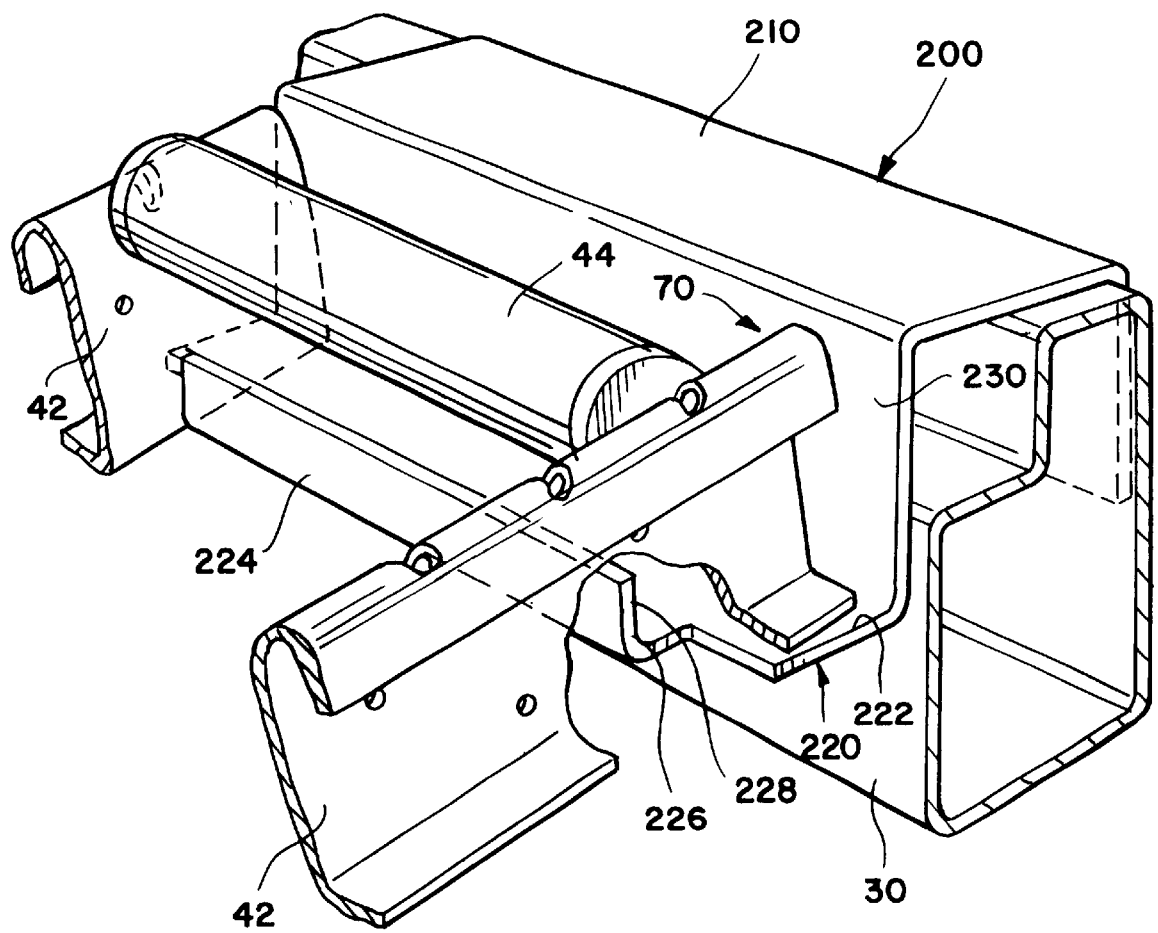
FIG. 7 is a similarly enlarged, fragmentary, perspective view of the back end of the roller track, as supported by the back hook, which is hooked over the back beam.

As shown in the drawings, a storage rack 10 of the type noted above comprises a front beam 20, a back beam 30, and a roller track 40. The front beam 20 and the back beam 30 are connected to columns 50 of the storage rack 10 in a known manner, which is simplified in the drawings to facilitate illustration of the preferred embodiment and which is outside the scope of this invention, possibly as disclosed in U.S. Pat. No. 5,713,476, the disclosure of which is incorporated herein by reference.

The roller track 40 comprises two side rails 42 and a series of rollers 44, each of which extends and is journalled between the side rails 42 and each of which projects above the side rails 44, so as to define a tangent plane P above the side rails 44. Each roller 44 is journalled on a spindle 46, which is mounted so as to extend across and through holes 48 in the side rails 42, via polymeric bushing 50 at each end of said roller 44. An upper flange 54 of each side rail 42 is bent over, as shown, so as to confine the spindles 46, which, as confined, cannot be accidentally disassembled from the side rails 42. Several tubular braces 54 are mounted between the side rails 42, each brace 54 being mounted to the side rails 42 via a carriage bolt 56 receiving a nut 58. The braces 54 are not used to mount the roller track 40.

As described so far, the roller track 40 is similar to roller tracks known heretofore. In the storage rack 10, the roller track 40 may be one of plural roller tracks on a given tier, which may be one of plural tiers. The roller track 10 is inclined frontwardly and downwardly in a manner to be herein described, so that cartons or other items can "flow" (i.e. roll) frontwardly and downwardly from the back beam 30 toward the front beam 20, which stops them and restrains them against dropping from the roller track 40. Thus, the storage rack 10 may be also called a "flow" rack.

The storage rack 10 further comprises a front hook 100 having an upper portion 110, which is hooked over an upper edge 22 of the front beam 20, a lower portion 120, which defines a ledge 122 projecting backwardly toward the back beam 30 and which defines a flange 124 projecting upwardly from the ledge 122, and a connecting portion 130, which connects the upper portion 110 and the lower portion 120. The flange 124 is not as wide as the ledge 122 and is centered on the ledge 122, so that a notch 126 is defined at each end 128 of the flange 124. The front hook 100 is approximately as wide as the roller track 40.

The storage rack 10 further comprises a back hook 200 having an upper portion 210, which is hooked over an upper edge 32 of the back beam 30, a lower portion 220, which defines a ledge 222 projecting backwardly toward the front beam 20 and which defines a flange 224 projecting upwardly from the ledge 222, and a connecting portion 230, which connects the upper portion 210 and the lower portion 220. The flange 224 is not as wide as the ledge 222 and is centered on the ledge 222, so that a notch 226 is defined at each end 228 of the flange 224. The back hook 200 is approximately as wide as the roller track 40.

Each side rail 42 has a front end 60, at or near which said side rail 42 is supported on one of two end portions of the ledge 122 defined by the lower portion 120 of the front hook 100. Each side rail 42 extends through the notch 126 defined at one end 128 of the flange 124, which projects upwardly from the ledge 122, between the end portions of the ledge 122 and between the side rails 42, so as to limit lateral movement of the roller track 40 on the front hook 100. Each side rail 42 has a back end 70, at or near which said side rail 42 is supported on one of two end portions of the ledge 222 defined by the lower portion 220 of the back hook 200. Each side rail 42 extends through the notch 226 defined at one end 228 of the flange 224, which projects upwardly from the ledge 222, between the end portions of the ledge 222 and between the side rails 42, so as to limit lateral movement of the roller track 40 on the back hook 200.

The connecting portion 230 of the back hook 200 is shorter than the connecting portion 130 of the front hook 100, so that the ledge 122 defined by the lower portion 120 of the front hook 100 is disposed below the upper portion 110 of the front hook 100, where hooked over the front beam 20, by a comparatively greater distance and so that the ledge 222 defined by the lower portion 220 of the back hook 200 is disposed below the upper portion 210 of the back hook 200, where hooked over the back beam 30, by a comparatively lesser distance. In a comparative sense, the front hook 100 is taller, or deeper, and the back hook 200 is shorter, or shallower. Thus, the roller track 40 can be frontwardly and downwardly inclined, even if the front beam 20 and the back beam 30 are level with each other, as shown. Also, the roller track 40 can be further inclined, if the back beam 30 is higher than the front beam 20.

Moreover, as shown, the tangent plane P defined by the rollers 44 above the side rails 42 intersects the connecting portion 130 of the front hook 100, below where the upper portion 110 of the front hook 100 hooks over the front beam 20. Thus, above where the tangent plane P intersects the connecting portion 130, the front hook 100 stops cartons or other items rolling along the roller track 40, toward the front beam 20, and restrains them against dropping from the roller track 40.

Similar taller and shorter hooks can be similarly used for fitting onto a storage rack, which has a front beam and a back beam, an elongate structure other than a roller track, such as an elongate structure having two side rails.

What is claimed is:

1. A storage rack comprising a front beam, a back beam, and a roller track, which is supported between the front and back beams, the roller track comprising two side rails and a series of rollers, each of which extends and is journalled between the side rails and each of which projects above the side rails, the rollers defining a tangent plane above the side rails, the storage rack further comprising a front hook having an upper portion, which is hooked over an upper edge of the front beam, the front hook having a lower portion, which defines a ledge having two end portions and projecting backwardly toward the back beam, and a back hook having an upper portion, which is hooked over an upper edge of the back beam, the back hook having a lower portion, which defines a ledge having two end portions and projecting frontwardly toward the front beam, each side rail having a front end, at or near a lower portion of which said side rail is supported on the end portions of the ledge defined by the lower portion of the front hook, and each side rail having a back end, at or near a lower portion of which said side rail is supported on the end portions of the ledge defined by the lower portion of the back hook, each hook having a flange projecting upwardly from the ledge defined by the lower portion of said hook, between the end portions of the lower portion of said hook and between the side rails, so as to limit lateral movement of the roller track on the ledge defined by the lower portion of said hook.

2. The storage rack of claim 1 wherein the ledge defined by the lower portion of the front hook is disposed below the upper portion of the front hook, where hooked over the front beam, by a comparatively greater distance and the ledge defined by the lower portion of the back hook is disposed below the upper portion of the back hook, where hooked over the back beam, by a comparatively lesser distance.

3. The storage rack of claim 2 wherein the tangent plane defined by the rollers above the side rails intersects the front hook, below where the front hook hooks over the front beam.

4. The storage rack of claim 1, 2, or 3 wherein each hook is approximately as wide as the roller track at the lower portions of the side rails.

* * * * *